3,532,647
COATING COMPOSITION COMPRISING SOLUBLE STARCH OR PROTEIN, MELAMINE-FORMALDEHYDE RESIN AND A <$C_{18}$ SUGAR
Daniel Dickerson Ritson, Riverside, and Ronald Raymond House, Darien, Conn., assignors to American Cyanamid Company, Stamford, Conn., a corporation of Maine
No Drawing. Filed Aug. 2, 1968, Ser. No. 749,586
Int. Cl. C08g 37/30, 37/32, 37/36
U.S. Cl. 260—6     4 Claims

ABSTRACT OF THE DISCLOSURE

A water-soluble sugar is employed as extender for part of the melamine-formaldehyde thermosetting resin present as latent insolubilizing agent in compositions containing a water-soluble starch or protein as coating component or otherwise for pigment when present. The compositions are useful for coating fibrous mineral and cellulosic webs.

---

The present invention relates to a novel composition for the coating of fibrous webs to provide said webs with an adherent film thereon. The invention includes the compositions themselves, the process of coating the webs therewith, and the resultant webs.

At the present time preferred compositions employed for the formations of coatings on fibrous webs consist essentially of an aqueous solution of a water-soluble starch or an alkali-soluble protein (or mixture thereof) as coating component, and a water-soluble thermosetting melamine-formaldehyde resin as latent insolubilizing agent for the starch or protein. The compositions contain enough water to be of fluid, spreadable viscosity but set to a hard and substantially water-resistant coating when they are spread upon a web and when the web is heated to a temperature in the range of 200° F.–350° F. for little more than the period of time needed to drive off the water in the composition.

The compositions may contain pigment, in which event the starch or protein acts as adhesive therefor. The pigment in addition to acting as opacifier, acts as coating agent smoothing the surface of the web and thereby improving the practicability thereof. Coatings which contain pigment are herein termed "pigmented coatings."

It is essential that such compositions possess excellent latent water-resistant properties, i.e., it is essential that films obtained by thermocuring the compositions remain non-blocking and non-bleeding when contacted with moisture. Paper carrying a cured coating of pigmented compositions of this type is customarily moistened to prepare it for offset printing; it is essential that the pigment remain in the coating and not bleed into the ink. Moreover, instruction manuals, menus, and magazines are frequently formed of paper which carries a pigmented coating of this type, and these publications are frequently exposed to moisture. It is essential that the coating be substantially unaffected by the moisture.

Compositions of the foregoing type are manufactured on a large scale, and it has long been desired to decrease their cost without more than negligibly decreasing their latent water resistant properties. It has been particularly desired to decrease the cost of the insolubilizer.

The discovery has now been made that a very substantial part of the thermosetting melamine-formaldehyde resin in compositions of the type described can be replaced by a water-soluble sugar without significant impairment of the latent water-resistant properties of the composition. We have found that when as much as 25% of the melamine-formaldehyde resin is replaced by a water-soluble sugar (so that the weight of the sugar is as much as ⅓ of the weight of the resin), the water resistance of paper coated with the sugar-containing composition in thermocured state is substantially the same as when the insolubilizer consists of the melamine-formaldehyde resin. The sugar acts therefore as extender for the resin, and is substantially less expensive than the resin.

The compositions of the present invention accordingly consist essentially of an aqueous solution of a water-soluble starch or an alkali-soluble protein (or mixture thereof) as coating component, a water-soluble thermosetting melamine-formaldehyde resin as latent insolubilizing agent for the coating component, and a water-soluble sugar as extender for the resin. The amount of the sugar may be any amount, up to ⅓ of the weight of the resin.

The sugars present in the compositions of the present invention are, for example, glucose, levulose, dextrose, sucrose, maltose and fructose. The compositions may contain mixtures of sugars, for example, the 1:1 molar ratio mixture of levulose and dextrose which is obtained by acid hydrolysis of cane sugar. The sugars are soluble at least to the extent of about 10% by weight in water at 20° C., and preferably are monosaccharides and disaccharides. They contain fewer than 18 carbon atoms, and for brevity are herein described as "water-soluble <$C_{18}$ sugars."

Sugars and carbohydrates which contain 18 or more carbon atoms per repeating unit (e.g., raffinose) either do not act at all as extenders for the melamine-formaldehyde resin or act as extenders to a negligible extent.

The compositions of the present invention are prepared by any of the methods which have been previously employed for the manufacture of like compositions, with the sugar added at any convenient point. In the composition, the sugar may be in partially reacted state with the resin and the term "sugar" as used herein includes sugar which is in that state.

The pigments present in compositions are those which are generally present in paper coating compositions. They include clay, titanium dioxide, barytes, blanc fixe and calcium carbonate among the white pigments, and ultramarine among the colored pigments. The principal pigment now present in compositions for the coatings of fibrous webs is clay, and this pigment is consequently preferred.

The proportion of the insolubilizing component to the starch and casein is varied from instance to instance to provide the amount of insolubilization required by particular circumstances, and the proportion of pigment (where present) is varied to provide added coating properties required by particular circumstances. Neither proportion is a feature of the invention.

The composition of the present invention may contain such other materials as have heretofore been present in paper coating compositions, for example, biocides, antifoam agents, fluidifiers, delusterants, perfumes, and an acid catalyst (preferably a latent acid catalyst such as ammonium chloride) for the melamine resin.

The fibrous web to which the composition of the present invention can be beneficially applied include paper, paperboard, cardboard, and hardboard.

The term "water-soluble thermosetting melamine-formaldehyde resin" is used in the present specification in its customary sense to designate a condensation product of melamine with formaldehyde which is water-soluble, and which is water-insoluble after it has been heated for five minutes as a film on a glass plate at 100° C. at an acid pH. The definition includes the lower alkyl derivatives of the thermosetting methylol melamines and low polymers of the foregoing. Suitable materials within this definition include trimethylol melamine, trimethoxymethyl melamine, tri(methoxymethyl)hydroxymethyl melamine, and hexakismethoxymethyl-melamine.

EXAMPLE 1

The following illustrates the comparative effectiveness of sucrose as extender for a water-soluble thermosetting melamine-formaldehyde resin in fluid aqueous coating compositions for paper. The results are shown in terms of coatings containing melamine-formaldehyde resin as control insolubilizing component, and of comparable coatings wherein part of the melamine resin is replaced by a water-soluble sugar.

The control insolubilizing resin solution is an aqueous solution containing 80% by weight of resin solids prepared by reacting one mol of trimethylolmelamine with 2.7 mols of methanol, according to the method of U.S. Pat. No. 2,715,619. The product for convenience is hereinafter termed "trimethoxymethyl melamine."

A pigmented paper coating composition wherein starch is the binder for the pigment and principal coating component is prepared by stirring 333 g. of a 22.5% by weight aqueous solution of a cooked converted coating starch (75 g. solids) into 705 g. of a 71% by weight aqueous slurry of a paper-coating clay (500 g. solids).

A 231-g. sample of the resulting dispersion is withdrawn and to this is added with stirring 4.17 g. of a 40% by weight solution of the above-described melamine resin, (equivalent to 10% resin on the weight of the starch). From previous experience it is known that this amount of melamine resin is sufficient to produce a satisfactory (but less than maximum) amount of insolubilization in the procedure adopted.

Test compositions are prepared by replacing part of the melamine resin with sucrose to the extents shown in the table below.

The compositions are applied to 50-lb. coating raw stock sheets by means of a 0.0005" Bird applicator. The sheets are dried in an oven having an air temperature of 300° F. for the number of minutes shown in the table below, and are then calendered.

The wet-rub resistance of the coating on the sheets is determined by standard laboratory test, wherein the coated sheet is mounted on a larger black sheet, the thumb is wetted with water and is drawn over first the coated sheet and then over the black sheet so as to transfer to the black sheet any of the white pigment loosened by the wetting liquid. The amount of pigment thus transferred provides an index of the amount of coating removed and of the water-resistance of the coating.

Additional samples are prepared with the starch replaced with casein (as ammonium caseinate); the details are as follows.

To 333 g. of a 15% by weight aqueous solution of ammonium caseinate (50 g. of solids) is added 817 g. of a 61.2% by weight aqueous dispersion of clay (500 g. of clay). To 256 g. of the resulting dispersion is added 278 g. of a 40% by weight aqueous solution of the above-described melamine-formaldehyde resin (equivalent to 10% of resin based on the weight of the casein.

Test compositions are likewise prepared replacing part of the melamine resin with sucrose and applied as described above. In the test procedure, a 0.02% by weight aqueous solution of sodium hydroxide is employed in place of water.

The test results are reported on a scale of 10 on which 0 designates rapid and complete removal of the coating, 10 designates no removal of the coating, and intermediate values designate removal of intermediate amounts of the coatings. On this scale paper coated with a pigmented starch coating composition gives a value of 0. A change of ±1 unit or less is regarded as of no practical consequence. Results are as follows:

COATING COMPOSITION

| | | | | Insolubilizer | | | | |
| | | | | | | Sugar | | |
| Run No. | Binder | Pigment | Percent [1] | Percent Mel.[2] | Name | Percent [3] | Min. in oven [4] | Wet rub value [5] |
| --- | --- | --- | --- | --- | --- | --- | --- | --- |
| Control | Starch | Clay | 10 | 100 | | None | 1 | 3.0 |
| Do | do | do | 10 | 100 | | None | 4 | 8.0 |
| 1 | do | do | 10 | 80 | Sucrose | 20 | 1 | 3.0 |
| 2 | do | do | 10 | 80 | do | 20 | 4 | 8.0 |
| 3 | do | do | 10 | 70 | do | 30 | 1 | 4.0 |
| 4 | do | do | 10 | 70 | do | 30 | 4 | 8.0 |
| 5 | do | do | 10 | 80 | Corn syrup | 20 | 1 | 5.0 |
| 6 | do | do | 10 | 80 | do | 20 | 4 | 7.0 |
| 7 | do | do | 10 | 70 | do | 30 | 1 | 3.0 |
| 8 | do | do | 10 | 70 | do | 30 | 4 | 8.0 |
| Control | Starch | Clay | 5 | 100 | | None | 1 | 3.0 |
| Do | do | do | 5 | 100 | | None | 4 | 6.0 |
| 9 | do | do | 5 | 80 | Sucrose | 20 | 1 | 3.0 |
| 10 | do | do | 5 | 80 | do | 20 | 4 | 6.0 |
| 11 | do | do | 5 | 70 | do | 30 | 1 | 4.0 |
| 12 | do | do | 5 | 70 | do | 30 | 4 | 8.0 |
| Control | Casein | Clay | 10 | 100 | do | None | 1 | 10.0 |
| 13 | do | do | 10 | 100 | do | None | 4 | 10.0 |
| 14 | do | do | 10 | 70 | do | 30 | 1 | 9.0 |
| 15 | do | do | 10 | 80 | do | 20 | 1 | 10.0 |

[1] Melamine resin (or melamine resin+sugar), based on weight of starch (or casein).
[2] Percent melamine resin in insolubilizing component. Where percent is less than 100, remainder is sugar.
[3] Percent of melamine resin replaced by sugar.
[4] Oven temperature, 300° F.
[5] For explanation see text above.

EXAMPLE 2

The procedure of Example 1 is repeated except that the control insolubilizing resin solution is a blend at 70% solids of a 6:1 by weight mixture of trimethoxymethyl melamine and methylated dihydroxymethyl urea, adjusted to pH 8.3 by the use of ammonium hydroxide.

Results are as follows:

| Run No. | Binder | Pigment | Percent [1] | Mel.+urea [2] | Sugar Name | Sugar Percent [3] | Min. in oven [4] | Wet rub value |
|---|---|---|---|---|---|---|---|---|
| Control | Starch | Clay | 10 | 100 | None | None | 1 | 4.0 |
| 1 | Starch | Clay | 10 | 80 | Sucrose | 20 | 1 | 3.5 |
| 2 | do | do | 10 | 70 | do | 30 | 1 | 3.0 |

[1] Weight of 6:1 by weight mixture of trimethoxymethyl melamine and methylated dihydroxymethylurea, based on weight of starch.
[2] Percent of melamine resin-urea resin mixture in insolubilizing component. Where percent is less than 100, remainder is sucrose.
[3] Percent of melamine resin-urea resin mixture replaced by sugar.
[4] Oven temperature is 300° F.

We claim:
1. In a fluid aqueous coating composition for fibrous cellulose webs consisting essentially of (A) a material selected from the group consisting of a water-soluble starch and an alkali-soluble protein as coating component and mixtures thereof, and (B) a water-soluble thermosetting melamine-formaldehyde resin as insolubilizing agent for said coating component, a minor amount less than ⅓ the weight of said resin, of a water-soluble <$C_{18}$ sugar as extender for said resin.

2. A composition according to claim 1 wherein the sugar is sucrose.

3. A composition according to claim 1 wherein the sugar is a 50:50 molar mixture of glucose and fructose.

4. A composition according to claim 1 having a uniformly distributed content of clay as additional coating component.

References Cited

UNITED STATES PATENTS

| | | | |
|---|---|---|---|
| 2,204,384 | 6/1940 | Salisbury | 106—205 |
| 2,417,014 | 3/1947 | Pollard | 260—29.4 |
| 2,423,429 | 7/1947 | Pollard | 117—161 |
| 2,620,316 | 12/1952 | Ritson | 260—6 |
| 2,648,641 | 8/1953 | Robison | 260—17.3 |
| 2,773,848 | 12/1956 | Lindenfelser | 260—17.3 |
| 2,773,788 | 12/1956 | Magrane et al. | 260—17.3 X |
| 3,230,187 | 1/1966 | Oldham | 260—6 |

WILLIAM SHORT, Primary Examiner

H. SCHAIN, Assistant Examiner

U.S. Cl. X.R.

117—140, 148, 155, 161, 164, 165; 162—166, 174, 175, 184; 260—17.3